United States Patent

[11] 3,579,091

[72] Inventors Patrick W. Clarke
Murray Hill, N.J.;
Rudolph Scuderi, New York, N.Y.
[21] Appl. No. 825,368
[22] Filed May 16, 1969
[45] Patented May 18, 1971
[73] Assignee Bell Telephone Laboratories, Incorporated
Murray Hill, Berkeley Heights, N.J.

[54] SWITCHING REGULATOR WITH RANDOM NOISE GENERATOR
7 Claims, 4 Drawing Figs.

[52] U.S. Cl. .......... 323/22, 321/2, 323/38, 332/18
[51] Int. Cl. .......... G05f 1/56, G05f 1/64
[50] Field of Search .......... 328/162; 330/149; 332/18; 323/17, 18, 22 (T), 22 (SCR), 38; 321/18, 2 (Cursory)

[56] References Cited

UNITED STATES PATENTS

| | | | |
|---|---|---|---|
| 3,125,726 | 3/1964 | Clifton .......... | 328/162X |
| 3,350,628 | 10/1967 | Gallaher et al. .......... | 323/22X(T) |
| 3,388,349 | 6/1968 | Ault .......... | 332/18 |
| 3,437,905 | 4/1969 | Healey et al. .......... | 323/22X(SCR) |

*Primary Examiner*—J. D. Miller
*Assistant Examiner*—A. D. Pellinen
*Attorneys*—R. J. Guenther and E. W. Adams, Jr.

ABSTRACT: A switching regulator-converter wherein the error detector reference voltage is varied with a random noise signal to permit operation of the switching devices at frequencies in the audible range without the unacceptable acoustical noise normally accompanying these switching frequencies.

FIG. 1
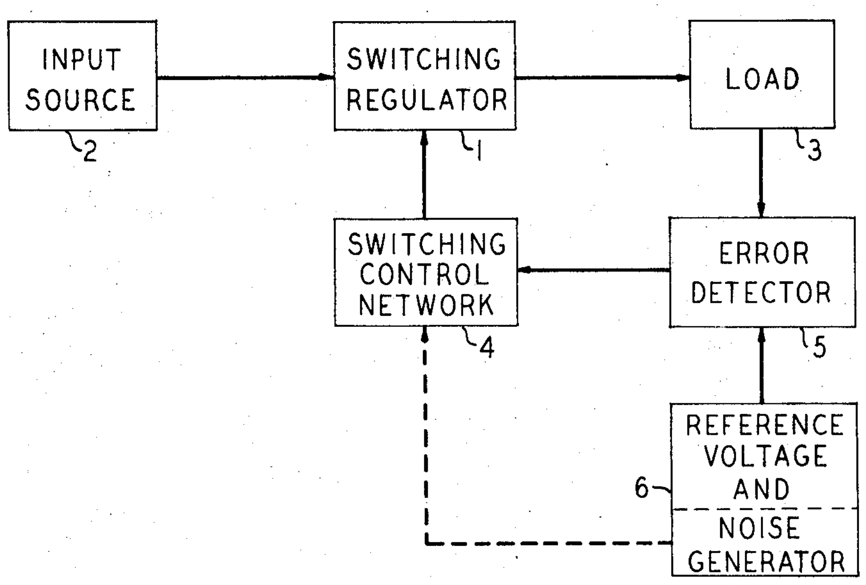
FIG. 4
FIG. 3
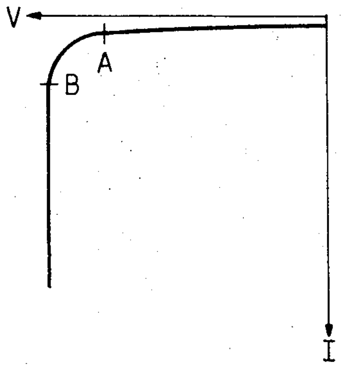
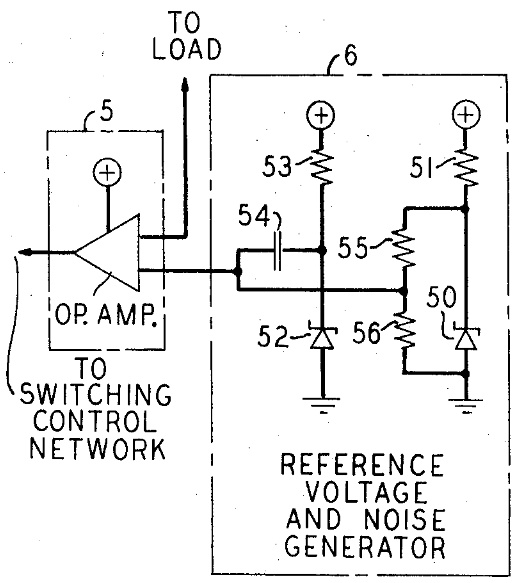
INVENTORS P. W. CLARKE
R. SCUDERI
BY John P. McDonnell
ATTORNEY

SWITCHING REGULATOR WITH RANDOM NOISE GENERATOR

BACKGROUND OF THE INVENTION

This invention relates to voltage regulation and conversion and, more particularly, to voltage regulation and conversion employing switching devices.

The regulation and conversion circuitry of the prior art employs switching devices which are switched at frequencies either in the audible range or in the ultrasonic range. Switching at frequencies in the audible range is accompanied by acoustical noise which, if not compensated for, reaches levels intolerable to the people working in the immediate environment of the equipment. To compensate for this unacceptable acoustical noise, the switching equipment is either physically isolated or surrounded with sound absorbing material that eliminates the acoustical noise. Both solutions to the problem waste space and increase the expense of switching regulation and conversion.

To avoid these problems of switching in the audible range, most regulator and converter circuits of the prior art used switching frequencies in the ultrasonic (above the audio) range. Operation at these ultrasonic frequencies, however, increases the expense of the components employed for regulation and conversion and additionally reduces the efficiency of regulation and conversion. The cost of the semiconductor components employed is increased since the operation of the device at the higher frequency reduces the maximum power and voltage capabilities of the devices. Moreover, the higher switching frequencies cause the devices to connect the input source to the load more frequently, hence more power is transmitted to the load. If the regulator or converter is employed to supply a range of loads, the circuit must be designed to recirculate the power at light loads, i.e., return the excessive power to the source at light loads. This recirculation of power reduces the efficiency of regulation and conversion.

It is, therefore, an object of this invention to provide regulating and conversion circuitry with switching frequencies in the audible range which does not require additional equipments or isolation to reduce acoustical noise to better than acceptable levels.

SUMMARY OF THE INVENTION

In the present invention, random noise is introduced into the feedback loop of a regulator-converter circuit to modulate the frequency at which the switching devices are operated. Modulating the switching frequency in this manner has been found to reduce the noise accompanying switching frequencies in the audible range to better than acceptable levels. The random noise may be introduced into the feedback loop at the error detector by using a Zener diode, which is reversed biased at the knee portion of its reverse breakdown characteristic, as both the reference voltage for the error detector and the noise generator. Alternatively, separate Zener diodes may be employed with one diode biased well beyond the knee portion of its reverse breakdown characteristic to serve as a reference voltage, while the second Zener diode is biased at the knee of its reverse characteristic and capacitor coupled to the first Zener diode. This latter arrangement then also provides a combined reference voltage-noise signal input to the error detector.

BRIEF DESCRIPTION OF THE DRAWINGS

Other objects and features of the present invention will be readily apparent from the following discussion and drawings in which:

FIG. 1 is a block diagram of one embodiment of the invention;

FIG. 3 represents the reverse voltage-current characteristic of a typical Zener diode; and FIG. 4 is a schematic embodiment of alternate reference voltage and noise generator circuitry which may be employed in the schematic embodiment of FIG. 2.

DETAILED DESCRIPTION

Figure 2:
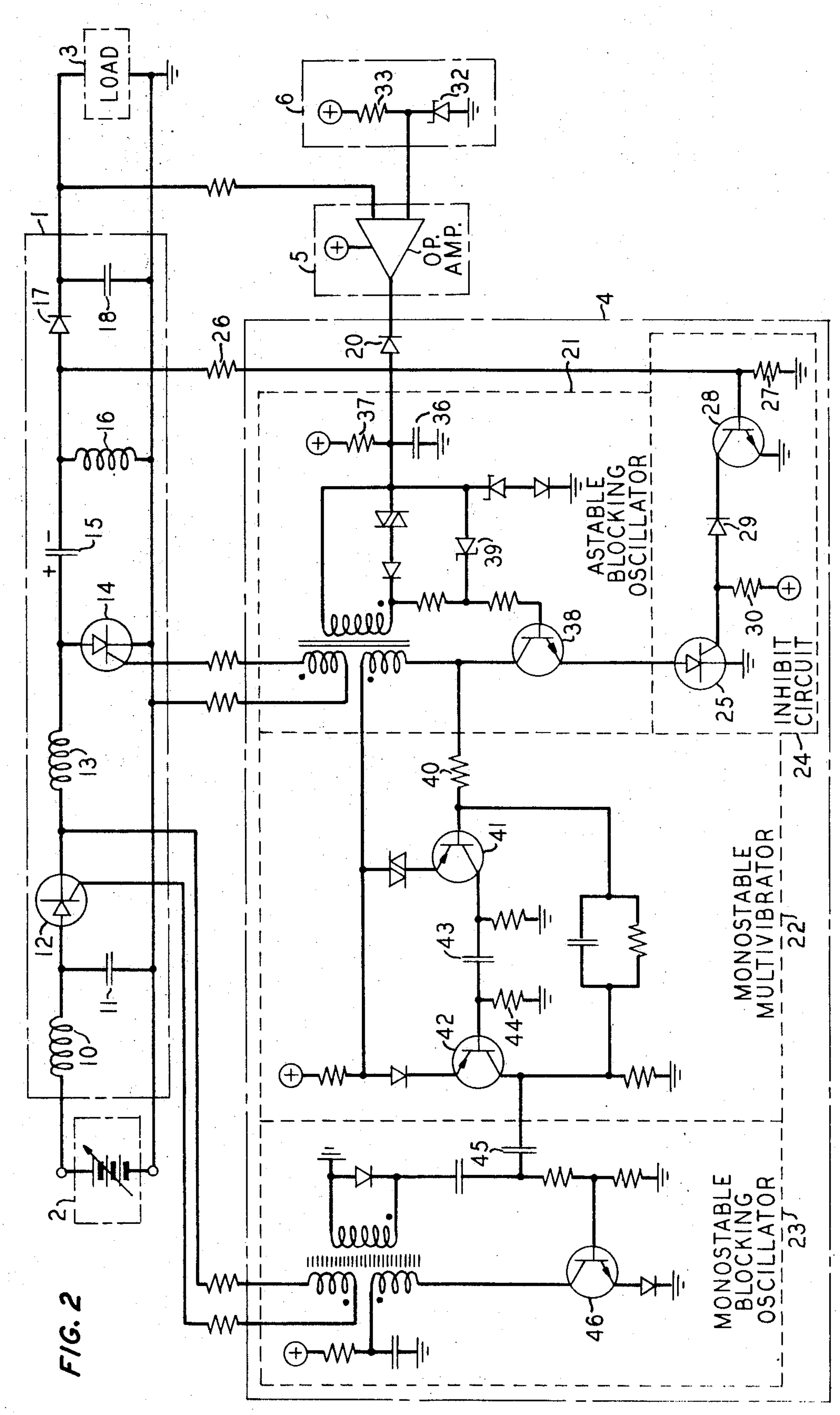
FIG. 2 is a schematic embodiment of the block diagram of FIG. 1.

As can be seen from the block diagram of FIG. 1 of the drawing, a switching regulator network 1 is connected between an input source 2 and a load 3. The switching control network 4 is connected to the switching regulator 1 to control the switching intervals of the switching devices of this circuit. An error detector 5 is connected to the load 3, the switching control network 4, and a reference voltage and noise generator 6. As noted by the dotted lines in FIG. 1, the noise generator may alternately be connected to the switching control network 4.

As noted heretofore, the switching regulators and converter circuits of the prior art often employ switching frequencies higher than the frequencies in the audible range due to the unacceptable acoustical annoyance accompanying operation at switching frequencies in the audible range. It has been found that varying the switching signal in such a system with random noise appreciably reduces the acoustical noise to well below acceptable levels when operating at switching frequencies in the audible range. Thus, in the regulation scheme of FIG. 1, random noise is impressed on the reference voltage of the error detector 5 to vary the error signal transmitted to the switching control network 4 and thereby effectively modulate the switching intervals of the switching regulator 1. THe noise generator employed may be any such generator capable of producing a noise signal of satisfactory magnitude. For example, a Zener diode reversed biased on the knee of its breakdown characteristic may be employed for this purpose since error detector circuits commonly employ Zener diodes as a reference voltage. This reversed biased Zener diode may serve as both the noise generator and reference voltage hence a single block 6 is shown in FIG. 1 for both the reference voltage source and noise generator. As shown by the dotted lines of FIG. 1, this random noise may also be introduced directly at the switching control network 4 if so desired.

The circuit of FIG. 2 illustrates a schematic embodiment of the block diagram of FIG. 1 which employs a single Zener diode as both the reference voltage for the error detector and the noise generator, In the schematic circuit of FIG. 2, the switching regulator 1 also provides DC to DC conversion. Inductor 10 and capacitor 11 are serially connected across the DC input source 2 as an input filter. A silicon controlled rectifier (hereinafter referred to as SCR) 12 is serially connected with inductor 13 and SCR 14 across filter capacitor 11. Capacitor 15 and inductor 16 are serially connected across SCR 14 which, as discussed hereinafter, with inductor 16 provides a discharge path for capacitor 15. Diode 17 is connected from the capacitor 15 to the load 3 and is poled for forward conductivity from the capacitor 15 to load 3. Filter capacitor 18 is connected across the load 3.

The regulating or feedback loop of the circuit of FIG. 2 includes the error detector 5 which has one input connected through a current limiting resistor to the load 3 and a second input connected to the reference voltage and noise generator network 6. The error detector 5 may be either a single transistor or any of a host of readily available operational amplifiers such as, for example, the Motorola 1431G. Diode 20 is connected from the output of error detector 5 to the base circuit of the transistor of the astable blocking oscillator 21 of the switching control network 4. The switching control network 4 also includes a monostable multivibrator 22 whose input is connected to an output of astable blocking oscillator 21 while its output is connected to the input of monostable blocking oscillator 23. An inhibit circuit 24 whose output is connected with astable blocking oscillator 21 and whose input is connected across well-known load 3 form the remaining portion of the switching control network 4. As discussed in detail hereinafter, astable blocking oscillator 21 provides triggering or turn-on pulses for sCR 14 through a pair of current limiting resistors, while monostable blocking oscillator 23 provides triggering pulses to SCR 12, also through a pair of current limiting resistors, after a delay determined by the parameters of monostable multivibrator 22. The astable blocking oscillator 21 may be one of any number of well-known RC controlled blocking oscillator circuits with a switching device such as SCR 25 connected between the transistor emitter circuit and ground. Similarly, monostable multivibrator 22 and monostable blocking oscillator 23 may be any of a large number of well-known circuits whose operation is sufficiently described in standard texts to forego further discussion at this time. The monostable blocking oscillator circuit illustrated in FIG. 2 is a common emitter blocking oscillator circuit using a transformer having a rectangular B-H, or saturable, core characteristic.

The inhibit circuit comprising SCR 25 has a voltage divider including resistors 26 and 27 serially connected across the input inductor 16. The base electrode of transistor 28 is connected to the juncture of resistors 26 and 27 while its emitter electrode is connected to ground. Diode 29 is connected in the forward conductivity direction from the gate electrode of SCR 25 to the collector electrode of transistor 28 to limit the voltage across the gate-cathode electrodes of SCR 25. Resistor 30 is connected from the junction of the diode 29 and the gate electrode of SCR 25 to a source of positive potential to provide a continuous gate bias for SCR 25. The reference source and noise generator 6 comprises Zener diode 32 and resistor 33 serially connected from a source of positive potential to ground. The operation of this noise generator is discussed in detail hereinafter.

The regulating and conversion portion of the present circuit comprise an input loop which includes SCR 12, capacitors 11, 15, and 18, and diode 17, and inductor 13 and an output loop which also includes capacitors 15 and 18 and diode 17 in addition to SCR 14 and inductor 16. Inductor 10 is a filter inductor, capacitor 11 serves as a low impedance source for the input loop, and capacitor 18 is chosen to have a relatively large value of capacitance so that voltage across it is essentially a constant value of DC. Conversion is achieved by the characteristic resonant action of the LC components in the input loop to charge the common capacitor 15 of each loop to a voltage greater than the input voltage. (In general, it will be recalled that a series resonant circuit without appreciable damping characteristically charges the capacitor to a voltage to having a magnitude twice that of the input voltage to the network minus the initial voltage on the capacitor.)

The operation of the converter circuit is most easily explained by assuming that the circuit has been in operation for a few cycles and that SCR 12 is triggered into conduction by the monostable blocking oscillator circuit 23 and SCR 14 is nonconductive. During this condition, capacitor 15 charges from the DC input source 2 to a potential having the polarity shown in the drawing with this charging current also flowing through the now forward biased diode 17 to supplement and charge on the large capacitance output capacitor 18. This input loop resonates at the frequency determined by the LC series network comprising inductor 13 and capacitor 15. Capacitor 15 is thus charged to a potential which is twice the magnitude of the DC input potential less the potential stored in output capacitor 18. When the resonant current in this loop falls to a valve less than the value of the forward sustaining current of SCR 12 (close to the zero axis crossing of the negative going resonant current), this SCR is biased out of conduction and the input loop is interrupted.

In the sequence of events to be discussed hereafter, astable blocking oscillator 21, which is under the control of the inhibit circuit comprising SCR 25 and transistor 28 and the error detector 12, subsequently triggers SCR 14 into conduction. Once SCR 14 is conductive, the voltage across capacitor 15 is equal to the voltage across inductor 16 and these elements resonate at the frequency determined by their parameters. These elements continue to resonate until the voltage across inductor 16 reverses and is greater than the voltage stored in capacitor 18 by an amount equal to the forward voltage drop across diode 17. Diode 17 is thus forward biased into conduction to clamp the voltage across capacitor 15 to the output voltage across capacitor 18 less the small forward voltage drops across SCR 14 and diode 17. Since the large capacitance of output capacitor 18 results in this capacitor acting as a low impedance constant voltage source with respect to the remaining converter components, the current due to the stored energy in inductor 16 now flows as a ramp function into capacitor 18 to maintain the desired load voltage. Once the diode 17 is forward biased, the current through SCR 14 falls to zero, and the SCR is thus commutated for cutoff. In the sequential course of events to be discussed hereinafter, monostable blocking oscillator 23 then biases SCR 12 into conduction to recharge capacitor 15 and the discharge-charge cycle then repeats itself in the manner discussed. Conduction through SCR 12 also maintains forward conduction through diode 17 to provide a continuing discharge path for all the energy stored in inductor 16.

Zener diode 23 and resistor 33 are, as noted heretofore, serially connected from a source of positive potential, which may be a regulated source, to ground. The magnitude of resistor 33 is chosen to constrain the operation of Zener diode 32 to the knee portion of its reverse conduction breakdown characteristic. A typical reverse conduction Zener diode voltage-current characteristic is illustrated in FIG. 3, On the illustrative characteristic of FIG. 3, Zener or reverse conduction through the diode occurs at the voltage and current corresponding to point A in FIG. 3. Once reverse conduction is initiated, the reverse voltage across the diode continues to increase with increasing reverse current until point B at the end of the knee portion of the characteristic is reached. Once the diode is biased beyond point B, the reverse voltage across the diode remains constant for all further increases in reverse current within the operational limits of the diode. While operating on the knee portion of its characteristic, which in FIG. 3 extends from point A to point B, the Zener diode characteristically generates large amounts of noise. Constraining the diode to operation between point A and point B of its reverse breakdown characteristic thereby provides noise generation and, since the reverse voltage across the Zener diode varies only slightly across this range, the Zener diode may also serve as a reference voltage for an error detector. Zener diode 32 of the circuit of FIG. 2 is so employed.

As noted heretofore, the regulating feedback loop which controls the point in the cycle at which SCR's 12 and 14 are triggered into conduction comprises error detector 5, an inhibit circuit comprising SCR 25 and transistor 28, an astable blocking oscillator 21, a monostable multivibrator 22, and a monostable blocking oscillator 23. The error detector 5 compares the voltage at the positive terminal of the load with the potential across the reference-noise voltage of Zener diode 32. Whenever the voltage across the load transmitted via the resistor to the input of error detector 5 is less than the voltage at the reference and noise voltage input of error detector 5, the output error signal —voltage of error detector 5 is of sufficient magnitude to back bias diode 20. For load voltages where the input via the resistor is higher than the reference and noise voltage, the output noise-error signal voltage of error detector 5 permits the diode 20 to be forward biased.

If the diode 20 is back biased by the output of error detector 5, capacitor 36 of the blocking oscillator 21 is allowed to charge and normally trigger the astable blocking oscillator 21, i.e., the oscillator 21 is allowed to operate in its normal astable mode. When the load voltage input to error detector 5 is higher than the reference voltage input to error detector 5, diode 20 is forward biased and capacitor 36 is kept from charging by the low output impedance of the error detector 5. Oscillation in the astable blocking oscillator 21 is therefore prevented and no triggering or conduction initiating pulses will be delivered to either SCR 14 or 12 until the load voltage decreases below the reference voltage. As discussed in detail hereafter, oscillation through the astable blocking oscillator 12 is also controlled by the inhibit circuit comprising SCR 25 and transistor 28 until the charge stored in inductor 16 is dissipated during each cycle of energy transfer and storage.

As discussed, whenever diode 20 is reverse biased by the output signal from error detector 5, capacitor 36 of blocking oscillator 21 charges through resistor 37 and regeneratively initiates increasing conductive through transistor 38 in the well-known regenerative sequence of a blocking oscillator controlled by an RC network. The regeneratively increasing voltage thereby induced in the primary winding of the blocking oscillator transformer which is connected in the base circuit of transistor 38, breaks down Zener diode 39 to provide additional base drive to transistor 38. A voltage resembling a pulse is thereby induced in the tertiary winding of the oscillator transformer to which the gate-cathode electrodes of SCR 14 are connected. SCR 14 is thus triggered or biased into conduction. Once Zener diode 39 begins to conduct in the Zener direction, capacitor 36 discharges and charges to a potential of the opposite polarity through the base-emitter path of transistor 38 and the conductive SCR 25 to a potential limited by the potential across Zener diode 39. When capacitor 36 is charged to this opposite potential, transistor 38 turns off due to lack of base current and the voltage across the astable blocking oscillator 21 transformer windings fall to zero. A diode and varistor are connected across the primary winding of the transformer to limit the reverse voltage across the transformer. A Zener diode and diode are connected across capacitor 36 to limit the maximum voltage that may appear across capacitor 36 during the initial portion of the cycle.

At the same time conduction through transistor 38 of astable blocking oscillator 21 is initiated, the "pulse" of potential at the collector electrode of transistor 38 is transmitted via resistor 40 to the input transistor of monostable multivibrator 22. Since the operation of a monostable multivibrator such as monostable multivibrator 22 is well-known, it is not discussed further at this time. For present purposes it appears sufficient to note that the change in potential at the collector electrode of transistor 38 biases the normally off multivibrator transistor 41 into conduction and the normally on multivibrator transistor 42 into cutoff. After an interval of time determined by the capacitor 43 and resistor 44, transistor 41 again cuts off and transistor 42 again becomes conductive. Conduction through transistor 42 lowers the potential at its emitter electrode. This change in potential is transmitted via capacitor 45 to the input of the monostable blocking oscillator 23 to initiate a cycle of oscillation in this circuit.

The change in potential at the collector electrode of transistor 42, which is coupled by capacitor 45, initiates conduction through transistor 46 of monostable blocking oscillator 23. Conduction through transistor 46 produces an increasing voltage across the windings of the transformer, which has a saturable core, in the well-known regenerative blocking oscillator manner. The voltage induced in the tertiary winding of this transformer is transmitted to SCR 12 to initiate conduction in this device. These regenerative induced voltages also drive transistor 46 further into conduction in typical blocking oscillator fashion until the core of the transformer saturates. Once the core saturates, the base current in transistor 46 decays to zero, and the transistor returns to its normally cutoff state.

As discussed in our copending application, Ser. No. 825,195, filed with and assigned to the same assignee as the present invention, the error detector 5 and inhibit circuit comprising transistor 28 and SCR 25 allow the switching frequency to vary with the amount or quanta of energy transmitted held constant. The input to the inhibit circuit is connected across the output inductor 16 to determine when the energy is stored in inductor 16 is dissipated. Once the energy in inductor 16 is dissipated, the astable blocking oscillator 21 is allowed to function in the manner described heretofore, and a further quanta of energy is transmitted from the input source to the inductor 16 in the manner also discussed heretofore. Thus the quanta of energy transmitted to the load is fixed, while the switching frequency is allowed to vary. This arrangement inherently provides overload protection and eliminates the RF voltage spikes normally found in switching regulator and converter circuits.

SCR 25 is serially connected between the emitter electrode of astable blocking oscillator 21 and ground. Thus whenever the SCR 25 is not conducting, the oscillator circuit is disabled. The input to the inhibit circuit comprising SCR 25 is formed by a voltage divider comprising resistors 26 and 27 which are serially connected across the output inductor 16. The base-emitter path of transistor 28 is connected across resistor 27 so that transistor 28 becomes conductive whenever the polarity of the potential across inductor 16 is such as to make the base electrode of transistor 28 positive with respect to its emitter. Recalling that energy is stored in inductor 16 when SCR 14 is pulsed into conduction to discharge capacitor 15 into inductor 16, it will be readily seen that transistor 28 is held cutoff by the potential across inductor 16 during the initial portion of this energy transfer interval. The output loop comprising capacitor 15 and inductor 16 resonates through the conductive SCR 14 until the polarity of the potential across inductor 16 reverses. Once the polarity reverses and is greater than the voltage stored in capacitor 15 by an amount equal to the forward voltage drop across diode 17, the diode 17 is forward biased into conduction and the energy stored in inductor 16 discharges into capacitor 18 to maintain the desired load voltage, as discussed heretofore. Once diode 17 is forward biased, the forward current flow through SCR 14 falls to a value less than that required to maintain conduction through the SCR, which then cuts off.

Prior to the reversal of the polarity of the potential across inductor 16, SCR 25 of the inhibit network was conductive during each cycle of oscillation of oscillator 21 due to the continuous gate current provided by resistor 30 which is connected to a source of positive potential. The astable blocking oscillator 21 was thus allowed to oscillate freely in the typical astable manner discussed. Once the polarity of the potential across inductor 16 reverses, however, the potential across resistor 27 exceeds the forward base-emitter threshold voltage of transistor 28 and this transistor is biased into conduction. Once transistor 28 is conductive, the SCR 25 gate current from resistor 30 is diverted through the collector-emitter path of this transistor to prevent conduction through SCR 25 during the next cycle of oscillation in the oscillator 21. (SCR 25 normally commutates as the current decreases to zero through the collector-emitter path of transistor 38 after each cycle or pulse and, since gating or triggering bias is normally continuously supplied, is automatically biased into conduction for the next cycle or pulse of the oscillator 21.) Since current cannot now flow through the collector-emitter path of transistor 30, the astable blocking oscillator 21 is thus disabled, and no further triggering pulses will be transmitted to either SCR 12 or 14. Once the energy stored in inductor 16 is discharged, however, the voltage across resistor 27 will no longer be sufficient to maintain conduction through transistor 28, SCR 25 will again be biased into conduction, and the astable blocking oscillator 21 will function in the manner described heretofore.

Controlling the feedback loop in this manner provides overload protection and eliminates the RF voltage spikes normally encountered with switching regulator and converter circuits. Overload protection, including load short circuit protection, is obtained since increasing load causes the output voltage across capacitor 10 to decrease, which in turn increases the quanta of energy that inductor 16 must discharge to maintain the desired load voltage. (This is readily seen once it is remembered that inductor 16 linearly discharges through the large capacitance capacitor 18 until the energy stored in the inductor 16 is dissipated, which for overloads and lower capacitor 18 voltages will require longer intervals than for loads in the normal range.) Taking the extreme case of a load short circuit, the inductor 16 will discharge at only a negligible rate, transistor 28 will remain conductive, and the inhibit circuit comprising SCR 23 will remain cutoff to prevent astable blocking oscillator 17 and SCR 5 from again becoming conductive. No further energy will thus be transmitted through the system and the components of the converter-regulator will be protected from damage due to the transmission of excess energy caused by an overload condition.

THe RF voltage spikes normally encountered in switching regulator and converter circuits are also eliminated, since, as can be seen from the foregoing discussion, the minority carrier current in all the semiconductor devices is zero at the time they are switched. With no flow of minority carriers at the time of switching, there is no abrupt interruption thereof, and hence no RF voltage spike.

Although the schematic embodiment of the invention in FIG. 2 employs a single Zener Diode as both the reference voltage source and the noise generator, a separate noise generator and reference source may also be employed. FIG. 4 illustrates this alternative arrangement. In the circuit of FIG. 4, Zener diode 50 is serially connected with a resistor 51 between a source of positive potential and ground to provide a reference voltage for the operational amplifier error detector 5. In this arrangement, resistor 51 would be chosen so as to bias Zener diode 50 will beyond the knee portion of its characteristic discussed in connection with FIG. 3. A second Zener diode 52 is also serially connected with a resistor 53 between a source of positive potential and ground so as to be biased at the knee of its reverse voltage-current characteristic to serve as a noise generator as discussed heretofore. A capacitor 54 couples the noise generated by the zener diode 52 with the reference voltage input of Zener diode 50 to the error detector 5. Capacitor 54 also serves as a DC blocking capacitor. Since the input impedance to the operational amplifier 5 is relatively high, a voltage divider comprising resistors 55 and 56 is serially connected across zener diode 50 to provide the desired reference voltage to the input of operational amplifier 5 and to present a relatively high impedance to the noise signal input of capacitor 54. The operation of the arrangement of FIG. 4 will be identical to the operation of the single Zener diode reference voltage noise generator discussed in connection with FIGS. 1 and 2.

In summary, then, varying the reference voltage of an error detector with a random noise signal has been found to reduce substantially the unacceptable levels of acoustical noise found in switching regulator-converter circuits where the switching devices are operated at switching frequencies in the audible range. The noise generator employed for this purpose may be a zener diode biased at the knee breakdown portion of the reverse or Zener characteristic. This Zener diode may also serve as the reference voltage for the error detector or alternately separate Zener diodes may be employed with one diode capacitor coupled to the other. In this latter arrangement, the Zener diode serving as the reference voltage would be biased well beyond the knee portion of its Zener or reverse characteristic.

We claim:

1. A system for transmitting energy from an input source to a load comprising switching means connected between said source and said load, control means connected to said switching means to control the transmission of energy through said switching means, and a random noise generator connected to said control means to randomly and continuously vary the transmission of energy through said switching means in accordance with the said random noise signals, thereby permitting said switching means to be switched at frequencies in the audible range without unacceptable acoustical noise.

2. A switching regulator comprising switching means connected with a source of input potential and a load to permit the intermittent transmission of energy from said input source to said load, an error detector circuit comprising means responsive to load voltage variations connected across said load, and a source of reference voltage and noise which generates a continuous random noise signal connected to said error detector to provide the reference voltage for said error detector and randomly vary the error signal output from said error detector with said continuous random noise signal, whereby said switching means may be switched at frequencies within the audible range without unacceptable acoustical noise.

3. A switching regulator in accordance with claim 2 wherein said source of reference voltage and noise which generates random noise and provides a reference voltage includes a Zener diode which is biased so as to be constrained to operation at the knee portion of its reverse breakdown characteristic.

4. A switching regulator in accordance with claim 2 wherein said source of reference voltage and noise includes a separate source of reference potential and a separate noise generator the output of which is capacitor coupled to the source of reference voltage.

5. A switching regulator in accordance with claim 4 wherein said separate source of reference voltage comprises a first Zener diode reversed biased beyond the knee portion of its reverse breakdown characteristic and said separate noise generator comprises a second Zener diode reversed biased so as to be constrained to operation at the knee portion of its reverse breakdown characteristic.

6. A switching regulator comprising switching means serially connected with a source of input potential and a load to intermittently permit the transfer of energy from said input source to said load, switching control means connected to said switching means to control conduction through said switching means, and an error detector circuit connected to said load and to said switching control means to provide a first output signal for load voltages greater than the voltage of a reference voltage and noise generator source and a second output signal for load voltages less than the voltage of said reference voltage and noise generator source, said reference voltage and noise generator source including at least a Zener diode reversed biased so as to be constrained to operation at the knee portion of its reverse breakdown characteristic to provide both a reference voltage and random noise generation, whereby said switching means may be switched at frequencies in the audible range without unacceptable acoustical noise.

7. A switching regulator in accordance with claim 6 wherein said reference voltage and noise generator source includes a second Zener diode biased well past the knee portion of its reverse breakdown characteristic, a voltage divider connected across said second Zener diode having its voltage dividing point connected to the input of said error detector, and a capacitor for coupling said first Zener diode to the input of said error detector, whereby said first Zener diode provides a reference voltage and said second zener diode provides random noise generation.